Sept. 24, 1935.   J. R. REPLOGLE   2,015,126
VALVE STRUCTURE
Filed June 9, 1932
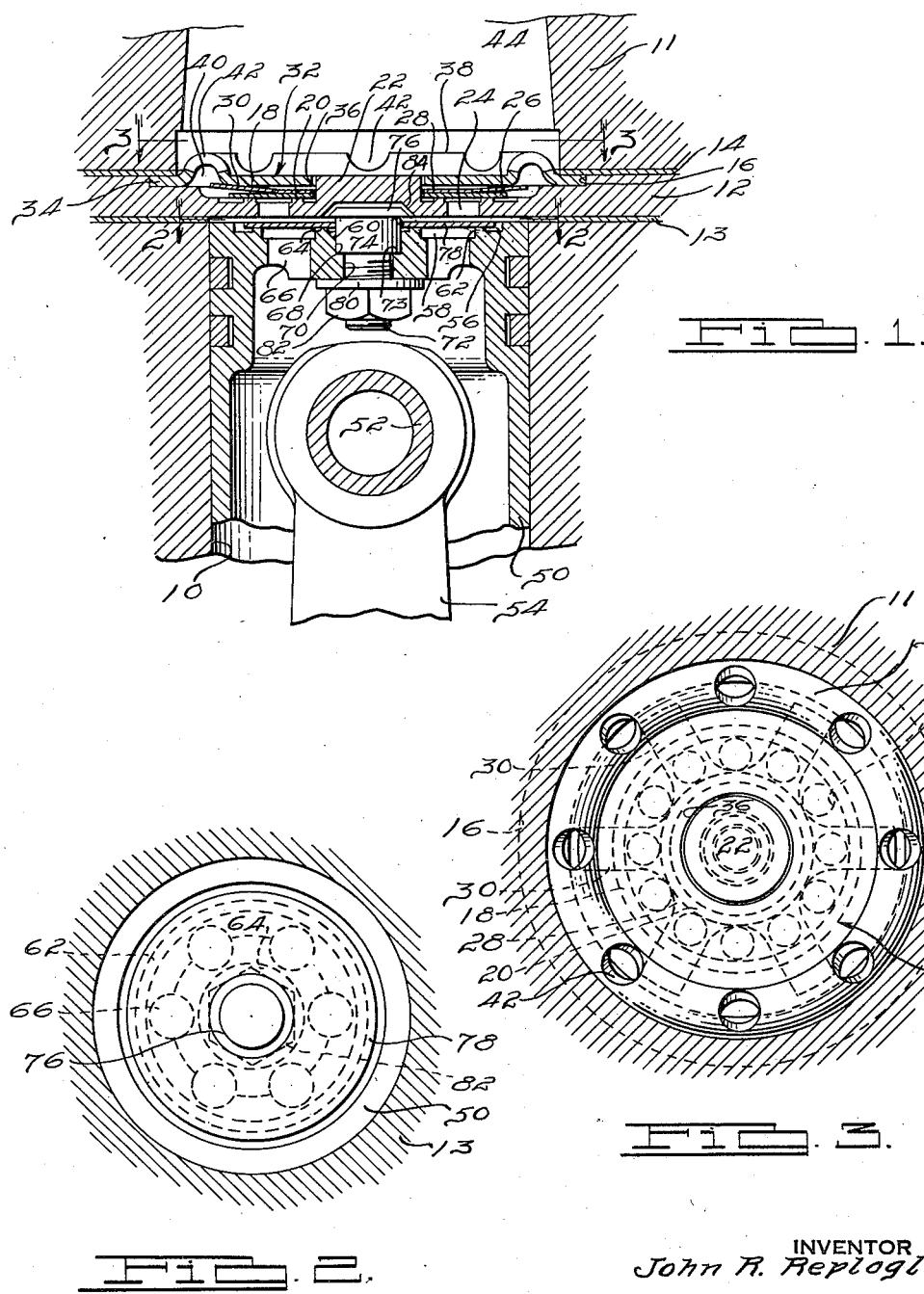
INVENTOR
John R. Replogle,
BY
ATTORNEYS.

Patented Sept. 24, 1935

2,015,126

UNITED STATES PATENT OFFICE 2,015,126

VALVE STRUCTURE

John R. Replogle, Detroit, Mich., assignor, by mesne assignments, to Copeland Refrigeration Corporation, Mount Clemens, Mich., a corporation of Michigan Application June 9, 1932, Serial No. 616,274

1 Claim. (Cl. 230—221)

This invention relates to valve structures and particularly to a type of such structures that is adaptable for use in connection with compressors of refrigerating mechanisms.

An object of the invention is to provide a valve structure of the type described that is simple in construction, efficient in operation and economical to produce.

Another object is to provide a valve structure in which the movable valve element is of minimum weight.

Another object is the provision of a valve structure that will result in a minimum of noise in operating at high speed.

Another object is the provision of a valve structure in which the only movable element thereof comprises a thin metallic disc.

Another object is the provision of a valve structure which will permit a minimum amount of clearance to be maintained between the head of the piston and the valve plate in a compressor structure.

Another object is the provision of a piston having a novel valve mechanism formed therewith.

Another object is the provision of a piston having an opening therethrough and a pair of annular valve seats between which said opening is located, a bolt secured in the piston within the inner of said seats and provided with a shank portion surrounded by a disc valve which is axially slidable thereon, the bolt having a head for limiting the amount of movement which said disc valve may have away from said seat.

The above being among the objects of the present invention the same consists in certain novel features of construction and combinations of parts to be hereinafter described with reference to the accompanying drawing, and then claimed, having the above and other objects in view.

In the accompanying drawing which illustrates a suitable embodiment of the present invention, and in which like numerals refer to like parts throughout the several different views, Fig. 1 is a fragmentary sectional view taken through the center of the cylinder of a compressor mechanism, and including the suction and discharge valve structures therefor.

Fig. 2 is a sectional view taken on the line 2—2 of Fig. 1 and showing the suction valve in plan view.

Fig. 3 is a sectional view taken on the line 3—3 of Fig. 1 and illustrating the discharge valve in plan view.

Referring to the drawing, a compressor cylinder is indicated at 10, a cylinder head at 11 and a plate 12 interposed therebetween which plate is commonly known as a valve plate and serves in part to form the discharge valve of the compressor structure. Suitable gaskets such as 13 and 14 are interposed respectively between the plate 12 and the cylinder 10, and between the plate 12 and cylinder head 11. In the instance shown the plate 12 is provided with a circular recess 16 in its upper surface and concentric with the cylinder 10, and the lower face of the recess is cut away to provide two annular valve seats 18 and 20, one positioned within the other and in generally spaced and concentric relation with respect to each other. The central portion of the plate 12 is not cut away, the result being the provision of an upstanding boss 22 thereon, preferably concentric with the cylinder 10. A plurality of openings 24 extend through the plate 12 between the upper and lower surfaces thereof and between the annular valve seats 18 and 20. Slidably guided for vertical movement on the boss 22 is a relatively thin disc valve 26 constantly urged towards engagement with the seats 18 and 20 by a spring comprising a central annular portion 28 and radially extending integral fingers 30, as best indicated in Fig. 3.

For maintaining the spring just described under suitable tension and for limiting the lift of the valve disc 26, a valve retaining member indicated generally as at 32 is provided. The member 32 is provided with a flat marginal edge portion 34, the outer diameter of which is substantially the same as the diameter of the recess 16 and which accordingly is receivable therein, and the thickness of the flange 34 is substantially equal to the depth of the outer edge of the recess 16 so that the member 32 is securely clamped in position when the cylinder head 11 is secured to the cylinder 10. The center of the member 32 is provided with an opening 36 which receives therein the boss 22 on the plate 12. The member 32 immediately inwardly of the flange 34 is formed to provide an annular upwardly projecting portion 38, the under side of which is consequently formed to provide an annular groove 40 against the radially inner edge of which the ends of the fingers 30 bear in wiping relationship. Openings 42, for the escape of gas below the member 32 into the gas receiving chamber 44 formed in the cylinder head 11 are formed in the portion 38 as best indicated in Figs. 1 and 3.

Reciprocably received within the cylinder 10 is a piston 50 which may be connected by means of a wrist pin such as 52 and connecting rod 54 with the usual crank or eccentric (not shown) which such compressors are conventionally provided with. The top surface of the piston 50 is annularly recessed as at 56, 58 and 60, in concentric relationship, to provide two upstanding concentric annular valve seats 62 and 64 respectively. Openings 56 extend through the head of the piston between the seats 64 and 66 to permit the passage of gas therethrough.

The central recess in the head of the piston is, in turn, centrally recessed as at 68 to a considerably greater depth and this recess communicates with a central opening 70 in which a threaded plug or bolt 72 is received. A shoulder 73 is thus formed at the junction of the recess 68 and opening 70. The bolt 72 is provided with an enlarged shank portion 74 and a head 76, the portion 74 being of a size to relatively closely fit the recess 68. A valve disc 78 slidably surrounds the shank portion 74 of a bolt 72 in a position to operatively engage the seats 62 and 64 and the length of the shank portion 74 is such as to permit a limited amount of axial movement of the valve disc 78 between the seats 62 and 64 and the head 76 of the bolt 72. The bolt 72 is secured in the head of the piston preferably by means of a lock washer 80 and a nut 82 and it is preferable when employing the nut 82 to draw the bolt 72 down into position with the lower end of the shank portion 74 in contact with the shoulder 73, that a suitable sealing compound be inserted in the recess 68 so as to insure a complete seal between the bolt and the head of the piston against the escape of gas.

The bolt 72 itself is preferably formed of a type of steel that may be brought to an extreme hardness upon suitable heat treatment so that there will be no appreciable wear of its surface along the area thereof where the valve disc 78 may rub in operation. The head 76 of the bolt 72 is preferably tapered and reduced in size, as indicated in Fig. 1, and the under side of the valve plate 12 is preferably recessed as at 84 for relatively close reception of the same when the piston is in its outermost position. The added clearance space between the pistons and the valve plate as a result of the projecting head of the bolt 72, is practically negligible as will be apparent and, consequently, the clearance volume between the piston and the valve plate may be brought to an extremely small volume in actual practice and thereby aid in producing a compressor mechanism having a high rate of efficiency.

It may be pointed out that heretofore in connection with discharge valves of the general type shown it has been considered necessary to provide an appreciable amount of weight in the movable parts of such valves so that the inertia of the movable valve parts at either end of the piston stroke will aid in opening and closing the valve. In practice, however, I have found the opposite to be true and that the movable part should be as light as possible so as to be influenced as quickly as possible by variations of pressure on opposite sides of the piston head, and consequently it will be apparent that with the suction valve structure indicated the only movable part in the suction valve is the valve disc 78 which, being of relatively thin material, is of extreme lightness. Not only does this feature permit quicker action of the valve but in addition, because of its lightness, it results in a valve structure which operates with a minimum of noise at high speed, particularly, where the lift of the valve is correctly proportioned to the amount of gas which must flow past it during operation.

Formal changes may be made in the specific embodiment of the invention described without departing from the spirit or substance of the broad invention, the scope of which is commensurate with the appended claim.

I claim:

In a device of the type described, in combination, a piston having a recess in the head thereof, a pair of concentric valve seats formed on the bottom of said recess, said head having openings therethrough between said seats, said head having an opening therethrough centrally of said seats, a bolt fixed in the last mentioned opening and having a head above the head of said piston, and a disc valve mounted on said bolt for axial movement between said head of said bolt and said seats, said disc valve being receivable in said recess and when in contact with said seats being disposed below the plane of the outer surface of said piston head.

JOHN R. REPLOGLE.